(12) United States Patent
Jung

(10) Patent No.: US 12,219,910 B2
(45) Date of Patent: Feb. 11, 2025

(54) PLANT CULTIVATION APPARATUS AND WATER SUPPLY METHOD THEREFOR

(71) Applicant: LG ELECTRONICS INC., Seoul (KR)

(72) Inventor: Ji Moon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 17/776,310

(22) PCT Filed: Sep. 10, 2020

(86) PCT No.: PCT/KR2020/012238
§ 371 (c)(1),
(2) Date: May 12, 2022

(87) PCT Pub. No.: WO2021/096047
PCT Pub. Date: May 20, 2021

(65) Prior Publication Data
US 2022/0394937 A1      Dec. 15, 2022

(30) Foreign Application Priority Data
Nov. 12, 2019   (KR) .......................... 10-2019-0144613

(51) Int. Cl.
*A01G 9/24* (2006.01)
*A01G 31/06* (2006.01)

(52) U.S. Cl.
CPC ............. *A01G 9/247* (2013.01); *A01G 31/06* (2013.01)

(58) Field of Classification Search
CPC ...... A01G 9/247; A01G 27/003; A01G 31/02; A01G 31/06
(Continued)

(56) References Cited

U.S. PATENT DOCUMENTS 5,813,605 A * 9/1998 Chou .................... A01G 27/003
                                                                        239/63
6,145,755 A * 11/2000 Feltz .................... A01G 25/167
                                                                        239/69
(Continued)

FOREIGN PATENT DOCUMENTS

CA       3028211 A1 *   7/2019   .......... A01G 25/167
CN       102150577         12/2012
(Continued)

OTHER PUBLICATIONS

International Search Report dated Dec. 30, 2020 issued in Application No. PCT/KR2020/012238.
(Continued)

*Primary Examiner* — Tien Q Dinh
*Assistant Examiner* — Erica Michelle Huebner
(74) *Attorney, Agent, or Firm* — KED & ASSOCIATES, LLP

(57) ABSTRACT

A plant cultivation apparatus is provided. The apparatus comprises a cabinet defining a cultivation chamber in which a plurality of beds are accommodated, and a liquid supply module provided in the cultivation chamber to supply liquid to at least one of the plurality of beds. A controller determines when to supply liquid to the plurality of beds, determines, based on information collected by the sensor, whether liquid is present in the plurality of beds in response to determining to supply liquid to the plurality of beds, and sequentially perform a liquid supply operation to one or more beds, of the plurality of beds, in which liquid is not present.

20 Claims, 15 Drawing Sheets

(58) Field of Classification Search
USPC .............................................................. 47/17
See application file for complete search history.

(56) References Cited

U.S. PATENT DOCUMENTS

| | | | | |
|---|---|---|---|---|
| 6,805,147 | B2 * | 10/2004 | Yoshioka | A01G 27/003 239/69 |
| 8,408,229 | B2 | 4/2013 | Goldberg et al. | |
| 10,455,777 | B1 * | 10/2019 | Dennison | A01G 9/02 |
| 2009/0293354 | A1 | 12/2009 | Goldberg et al. | |
| 2012/0083929 | A1 * | 4/2012 | Conrad, Jr. | A01G 9/02 700/284 |
| 2016/0029574 | A1 | 2/2016 | He et al. | |
| 2018/0132434 | A1 | 5/2018 | Fu | |
| 2018/0279563 | A1 * | 10/2018 | Wolfe | A01G 25/02 |
| 2018/0325038 | A1 | 11/2018 | Spiro | |
| 2019/0191643 | A1 * | 6/2019 | Chan | H05B 45/10 |
| 2019/0320602 | A1 * | 10/2019 | Doehling | A01G 27/003 |

FOREIGN PATENT DOCUMENTS

| | | | |
|---|---|---|---|
| CN | 103975839 | 8/2014 | |
| CN | 103416292 | 7/2015 | |
| DE | 102018101697 B3 * | 4/2019 | ........... A01C 23/042 |
| KR | 20-0465385 | 2/2013 | |
| KR | 20-0467246 | 6/2013 | |
| KR | 10-1342141 | 12/2013 | |
| KR | 10-1400375 | 6/2014 | |
| WO | WO-2017163056 A1 * | 9/2017 | ........... A01G 27/001 |
| WO | WO-2018011538 A1 * | 1/2018 | ........... A01G 27/003 |
| WO | WO-2019157598 A1 * | 8/2019 | ............. A01G 7/045 |

OTHER PUBLICATIONS

Extended European Search Report dated Oct. 31, 2023 issued in Application No. 20887257.2.

* cited by examiner

PLANT CULTIVATION APPARATUS AND WATER SUPPLY METHOD THEREFOR

CROSS-REFERENCE TO RELATED PATENT APPLICATIONS

This application is a U.S. National Stage Application under 35 U.S.C. § 371 of PCT Application No. PCT/KR2020/012238, filed Sep. 10, 2020, which claims priority to Korean Patent Application No. 10-2019-0144613, filed Nov. 12, 2019, whose entire disclosures are hereby incorporated by reference.

TECHNICAL FIELD

The present disclosure relates generally to a plant cultivation apparatus capable of automatically performing air circulation, light supply, and water supply for plant cultivation and a water supply method therefor.

BACKGROUND ART

Generally, a plant cultivation apparatus is a device cultivating plants in a seed state.

Recently, the plant cultivation apparatus has been provided in various forms that may easily cultivate plants indoors.

The indoor plant cultivation apparatus may be classified into a hydroponic cultivation apparatus and a soil cultivation apparatus.

The hydroponic cultivation apparatus is an apparatus for cultivating plants in a state in which the roots of plants are immersed in water supplied with nutrient solution. In the case of the hydroponic cultivation apparatus, when supply water in which the roots of the plant are immersed is used without continuous circulation or replacement, contamination of the supply water, such as green algae, may occur. The contamination of the supply a water may cause odor.

Further, the soil cultivation apparatus is a device using a cultivation method of planting a plant (or seeds) in soil of a pot and continuously supplying water to the pot, as proposed in Korean Patent No. 10-1400375 (document 1), Korean Utility Model Registration No. 20-0467246 (document 1), and Korean Utility Model Registration No. 20-0465385 (document 2).

In this case, compared to the hydroponic cultivation apparatus using nutrient solution, the soil cultivation apparatus may further improve growth of a plant due to nutrients in the soil and increase the growth rate of the plant.

However, in the soil cultivation apparatus of the document 1 and the document 2 described above, feed water is supplied to soil of culture ground in a state in which the feed water is sufficiently stored in a water reservoir, rather than water is periodically supplied to the soil.

In other words, the document 1 and the document 2 only disclose a configuration for supplying water to a water reservoir and does not disclose a method of efficiently supplying water to plants at all.

DISCLOSURE OF INVENTION

Technical Problem

The present disclosure is devised to solve various problems according to the prior art described above, and an object of the present disclosure is to provide a plant cultivation apparatus capable of efficiently supplying water to a plurality of beds and a water supply method thereof.

In addition, another object of the present disclosure is to provide a plant cultivation apparatus capable of efficiently supplying water to plants while preventing occurrence of odors and deterioration due to water or nutrient solution and a water supply method thereof.

The problems of the present disclosure are not limited to the aforementioned problems, and any other problems not mentioned herein will be clearly understood from the following description by those skilled in the art.

Solution to Problem

According to an embodiment, a plant cultivation apparatus may include a cabinet including a cultivation room in which a plurality of beds are accommodated and plants are grown, a residual water detection sensor configured to detect whether residual water of feed water supplied to the plurality of beds is present, a water supply module provided in the cultivation room to supply feed water to the plurality of beds, and a controller configured to perform a water supply process when a specified water supply cycle for the plurality of beds is reached, determine whether water is present in the plurality of beds using the residual water detection sensor when the water supply process is performed, and sequentially perform the water supply operation to one or more beds in which no water is present, among the beds, wherein the water supply operation is an operation of supplying water of a predetermined watering amount to the bed in which no water is present, counting a number of times of water supply for the bed, and waiting for a water supply delay time.

According to the present embodiment, since the water supply module is operated to supply feed water according to whether residual water is present in each bed, only a suitable amount of moisture may be supplied to plants always, thereby preventing the occurrence of residual water.

The controller may determine whether the plant cultivation apparatus is in a state capable of performing the water supply process when the water supply cycle is reached, and perform the water supply process when the plant cultivation apparatus is in the state capable of performing the water supply process.

The state capable of performing the water supply process may include at least one of a state in which water is present in the water tank, a state in which a door of the cabinet is closed, and a state in which the water tank is mounted in place.

The water supply module may include a water tank configured to store feed water, a water pump configured to pump water from the water tank to the bed, and a flow path valve configured to be opened to supply water pumped by the water pump to the bed.

The controller may repeatedly perform the water supply operation until a number of times of water supply of each of the plurality of beds reaches a specified number of times.

In the plant cultivation apparatus according to the present embodiment, water can be efficiently supplied for a plurality of beds.

The controller may drive the water pump for a predetermined time and open the flow path valve during the water supply operation.

The controller may obtain a time for which water remains in the bed when the water is present in the bed and terminate the water supply process when the obtained time is greater than a predetermined time.

The controller may terminate the water supply process regardless of the number of times of water supply when a predetermined time has elapsed from time when water is detected in each of the plurality of beds.

The controller may skip the water supply operation when the water is present in each of the plurality of beds and determine whether the water is present in the plurality of beds when the predetermined time has not elapsed.

The controller may terminate the water supply process when the number of times of water supply of each of the plurality of beds is greater than the specified number of times.

According to an embodiment of the present disclosure, a water supply method for a plant cultivation apparatus, the plant cultivation apparatus including a cabinet including a cultivation room in which a plurality of beds are accommodated and plants are grown and a residual water detection sensor which detects whether residual water of feed water supplied to the plurality of beds is present, the method may include performing a water supply process when a specified water supply cycle for the plurality of beds is reached, determining whether water is present in the plurality of beds using the residual water detection sensor when the water supply process is performed, and sequentially performing the water supply operation to one or more beds in which no water is present, among the beds, wherein the water supply operation is an operation of supplying water of a predetermined watering amount to the bed in which no water is present, counting a number of times of water supply for the bed, and waiting for a water supply delay time.

According to the present embodiment, since the water supply module is operated to supply feed water according to whether residual water is present in each bed, only a suitable amount of moisture may be supplied to plants always, thereby preventing the occurrence of residual water.

The performing of the water supply process may include determining whether the plant cultivation apparatus is in a state capable of performing the water supply process when the water supply cycle is reached, and performing the water supply process when the plant cultivation apparatus is in the state capable of performing the water supply process.

The water supply method may further include repeatedly performing the water supply operation until a number of times of water supply of each of the plurality of beds reaches a specified number of times.

In the plant cultivation apparatus according to the present embodiment, water can be efficiently supplied for a plurality of beds.

The water supply method may further include terminating the water supply process when the number of times of water supply of each of the plurality of beds is greater than the specified number of times.

The performing of the water supply operation may include driving the water pump for a predetermined time and opening the flow path valve during the water supply operation.

The water supply method may further include obtaining a time for which water remains in the bed when the water is present in the bed and terminating the water supply process when the obtained time is greater than a predetermined time.

The water supply method may further include skipping the water supply operation when the water is present in each of the plurality of beds and determining whether the water is present in the plurality of beds when the predetermined time has not elapsed.

The water supply method may further include terminating the water supply process regardless of the number of times of water supply when a predetermined time has elapsed from time when water is detected in each of the plurality of beds.

Advantageous Effects of Invention

According to the plant cultivation apparatus having a plurality of beds according to the embodiments of the present disclosure, it is possible to efficiently supply water to a plurality of beds.

According to the present embodiment, since the water supply module is operated to supply feed water according to whether residual water is present in each bed, only a suitable amount of moisture may be supplied to plants always, thereby preventing the occurrence of residual water.

According to the embodiments of the present disclosure, it is possible to efficiently supply water to plants while preventing the occurrence of odors and deterioration due to water or nutrient solution.

MODE FOR THE INVENTION

Hereinafter, specific embodiments of the present disclosure will be described in detail with reference to the drawings. Meanwhile, the spirit of the present disclosure is not limited to the suggested embodiments, and those skilled in the art to which the present disclosure pertains could easily suggest a further retrogressive disclosure or another embodiment which falls within the spirit of the present disclosure through the addition, modification, and deletion of another component without departing from the spirit of the present disclosure.

Hereinafter, embodiments of the inventive concept will be described with reference to the exemplary drawings.

Figure 1:
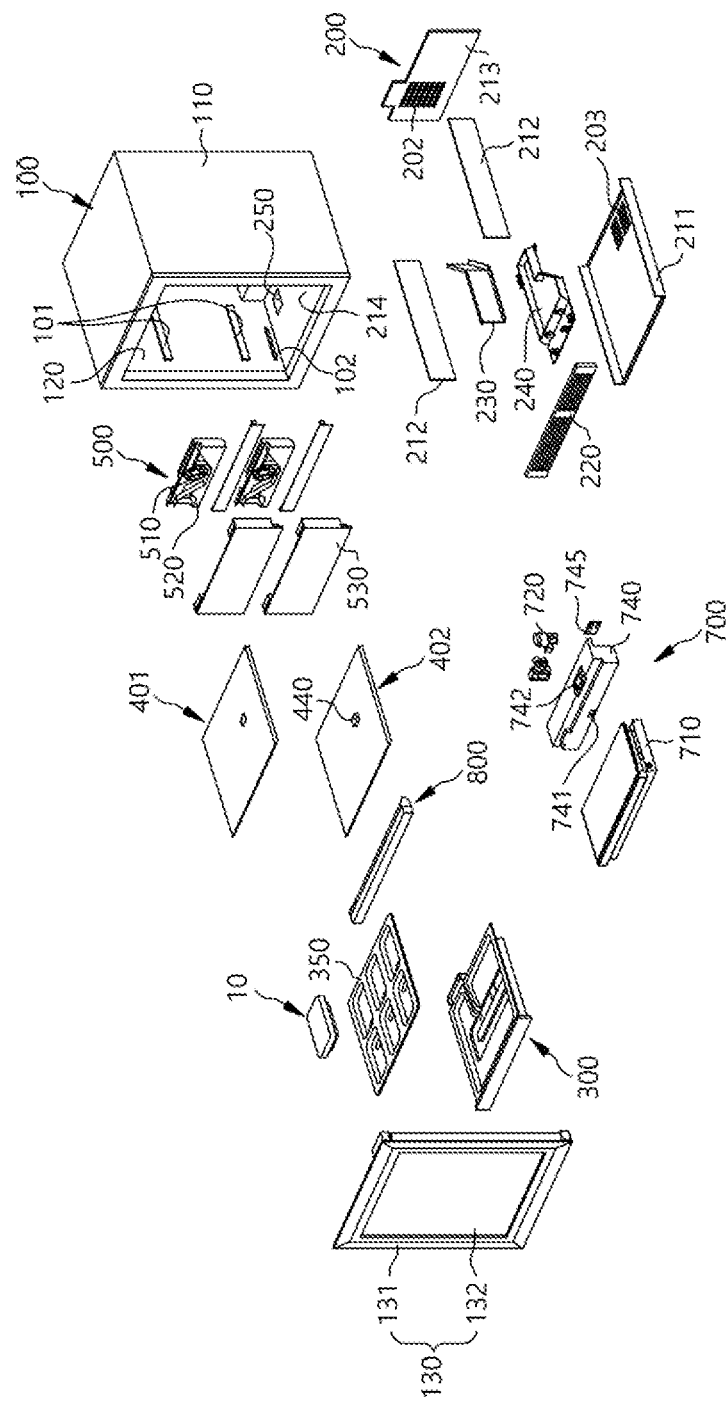
FIG. 1 is an exploded-perspective view showing a plant cultivation apparatus according to an embodiment of the present disclosure.
Figure 2:
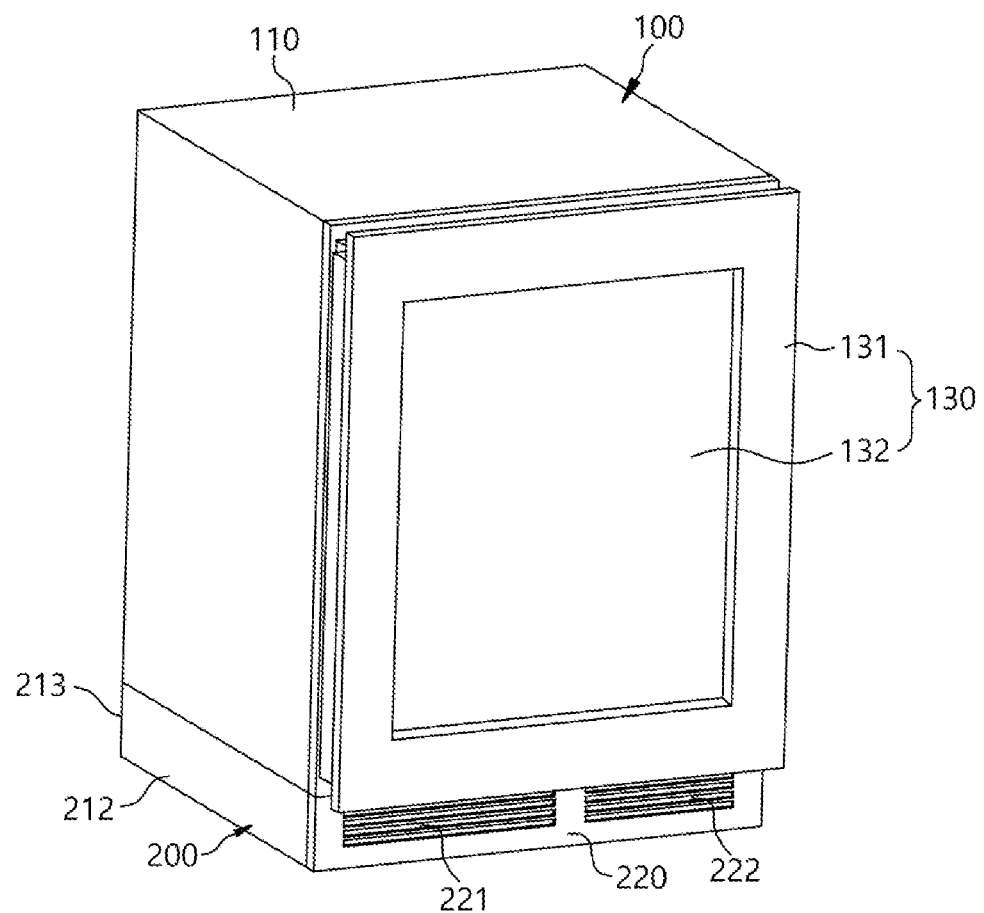
FIG. 2 is a perspective view showing the exterior of the plant cultivation apparatus according to the embodiment of the present disclosure, the plant cultivation apparatus in a state in which an open/close door of the plant cultivation apparatus is closed.
Figure 3:
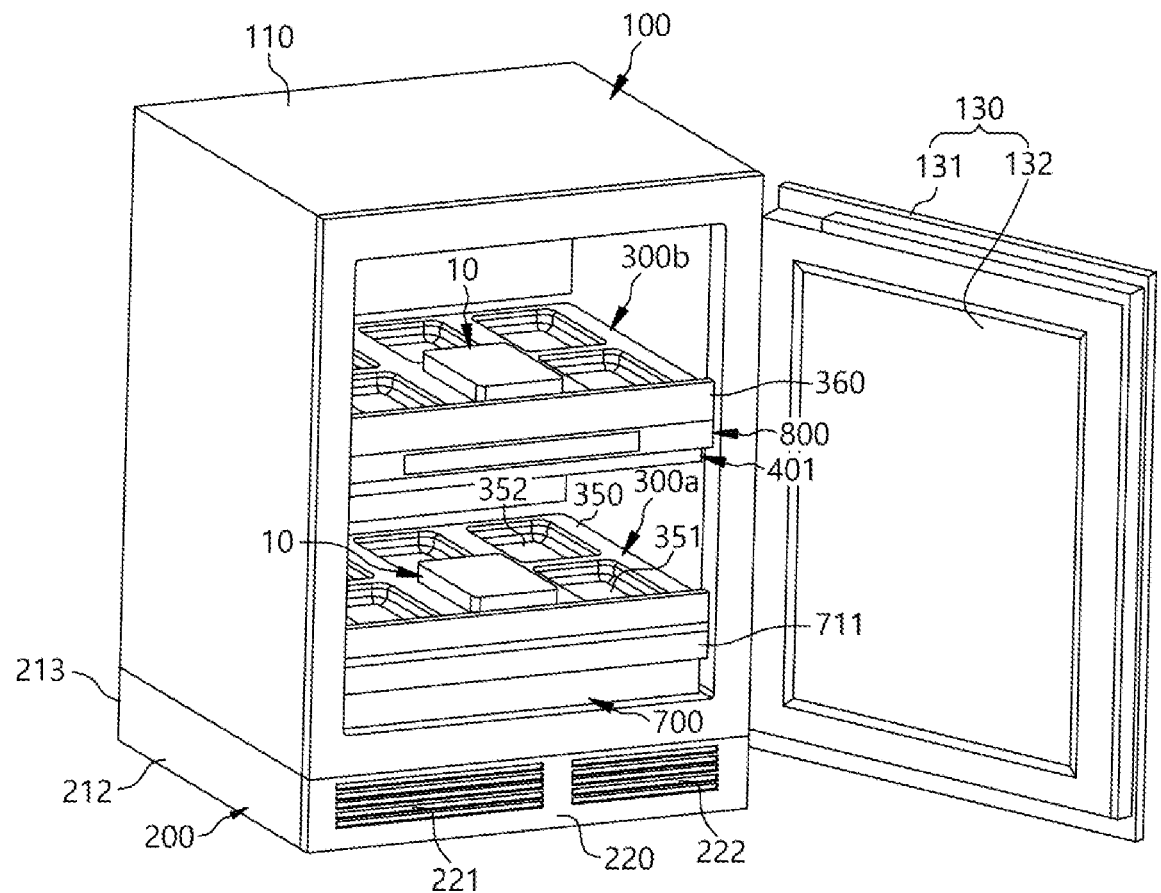
FIG. 3 is a perspective view showing the exterior of the plant cultivation apparatus according to the embodiment of the present disclosure, the plant cultivation apparatus in a state in which an open/close door of the plant cultivation apparatus is opened.

FIG. 1 is an exploded-perspective view showing the plant cultivation apparatus according to the embodiment of the present disclosure. FIG. 2 is a perspective view showing the plant cultivation apparatus according to the embodiment of the present disclosure. FIG. 3 is a perspective view showing the plant cultivation apparatus according to the embodiment of the present disclosure, the plant cultivation apparatus in a state in which an opening/closing door thereof is opened.

As shown in these drawings, the plant cultivation apparatus according to the embodiment of the present disclosure is largely configured to include a cabinet 100, a machine chamber frame 200, and a bed 300 on which a pod is placed. In particular, the machine chamber 201 may be configured to be open to the front to allow air to be sucked and discharged into the machine chamber through the front of the cabinet 100, enabling the machine chamber 201 to be mounted in a specific space like a built-in method.

The plant cultivation apparatus will be described for each configuration.

The pod 10 will be described with reference to FIGS. 4 and 5.

Figure 4:
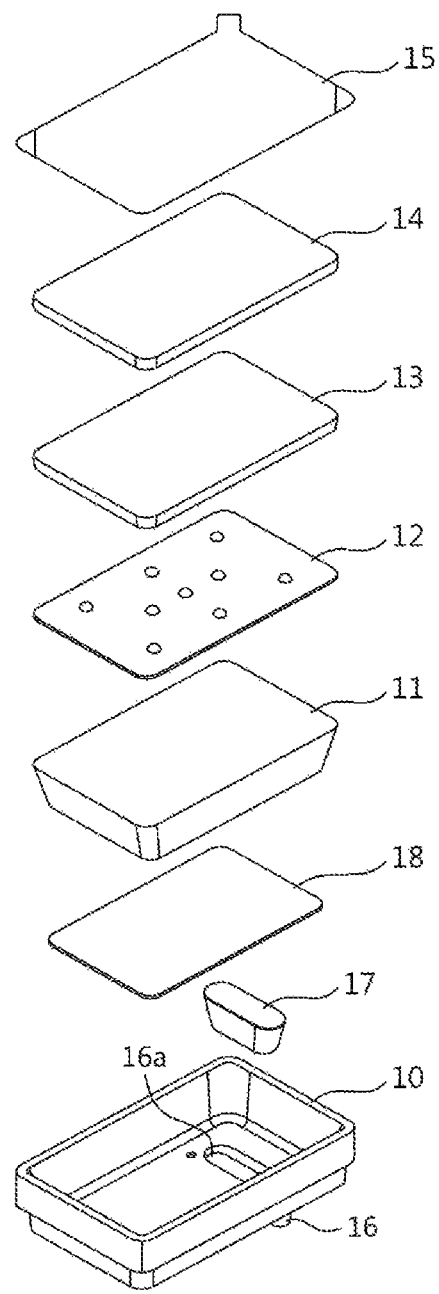
FIG. 4 is an exploded perspective view showing a pod of a plant cultivation apparatus according to an embodiment of the present disclosure.
Figure 5:
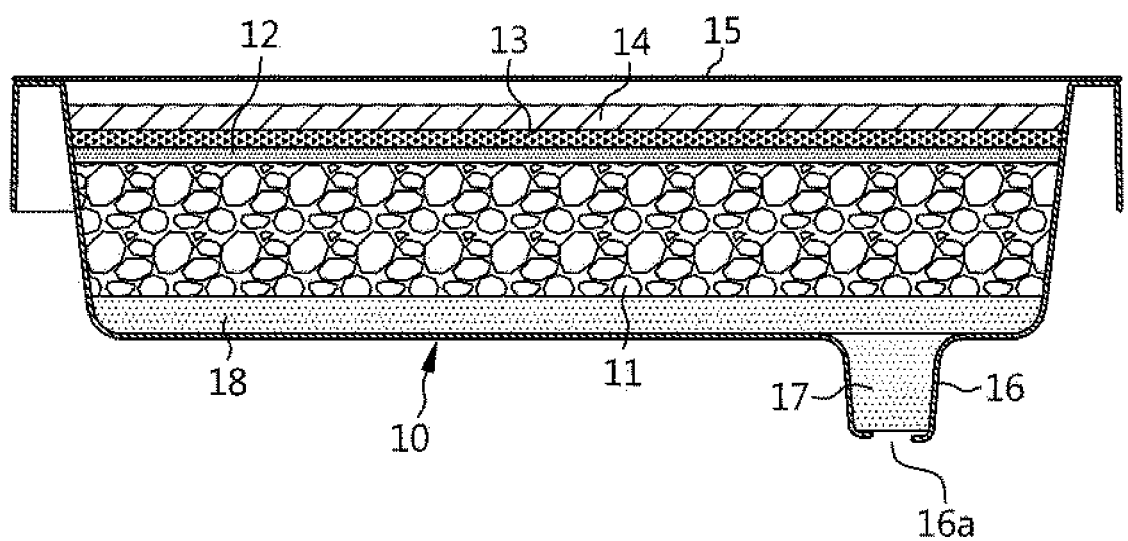
FIG. 5 is a side section view showing the pot of the plant cultivation apparatus according to the embodiment of the present disclosure.

FIG. 4 is an exploded perspective view showing a pod of a plant cultivation apparatus according to an embodiment of the present disclosure, and FIG. 5 is a side section view showing the pot of the plant cultivation apparatus according to the embodiment of the present disclosure.

The pod 10 may be formed in an upward open container. Bed soil 11 containing the nutrient solution (not shown) may be filled in the pod 10.

The nutrient solution may be a material containing a nutrient that is supplied to a plant to grow better. The nutrient solution may be provided in a water-soluble capsule form that gradually dissolves in water, so that the nutrient solution may be contained in the supply water while gradually dissolving every time when the supply water is supplied.

In addition, a seed paper 12 may be provided on an upper surface of the bed soil 11. The seed paper 12 may be a part where seeds are planted in a predetermined arrangement, and when the supply water is supplied while the seed paper 12 is seated on the upper surface of the bed soil 11, the seed paper 12 may completely dissolve and the seeds may remain on the bed soil 11.

A brick 13 may be provided on an upper surface of the seed paper 12. The brick 13 may be configured to control moisture and humidity of soil and to prevent mold growth, and be formed by processing mineral ore such as vermiculite into a powder form and then compresses.

An upper surface of the pod 10 may be covered with a protection sheet 15, thereby protecting the inside thereof. In particular, a packing member 14 may be provided between an upper surface of the brick 13 and the protection sheet 15, so that the brick 13 may be protected from the outside environment.

A type of a plant to be cultivated may be printed on a surface of the protection sheet 15.

Meanwhile, a protrusion 16 may be formed downward on a lower surface of the pod 10 and the protrusion 16 may be formed in a container body in which a water flow hole 16a may be provided at an lower surface thereof. The protrusion 16 may be formed in a hollow pipe structure that is open vertically and empty inside.

Further, a first absorber member 17 absorbing the supply water supplied to the bed 300 may be provided in the protrusion 16, and a flat plate shaped second absorber member 18 may be provided between the first absorber member 17 and the bed soil.

The second absorber member 18 may serve to uniformly supply the supply water absorbed by the first absorber member 17 to the entire portion of the bed soil 11.

Next, the cabinet 100 will be described with reference to FIGS. 1 to 3.

The cabinet 100 may be a part that forms the exterior of the plant cultivation apparatus.

The cabinet 100 may be formed in a container body that is open frontward, and include an outer case 110 providing an outer wall surface thereof and an inner case 120 providing an inner wall surface.

Herein, the outer case 110 may be formed in a container body shape that is closed at an upper surface, and a lower surface and a front surface are open.

The inner case 120 may be positioned in the outer case 110 while being spaced apart from the outer case 110. A foam insulation (not shown) may be filled between the inner case 120 and the outer case 110.

The cultivation room 121, 122 may be provided in the inner case 120. The cultivation rooms 121, 122 may be spaces provided for cultivation of plants.

The cultivation room 121, 122 may include a upper cultivation room 121 and a lower cultivation room 122. The two cultivation rooms 121 and 122 may be configured to have separate spaces, respectively.

The cabinet 100 may have an opening/closing door 130 at a front surface thereof.

The opening/closing door 130 may be configured to open and close the cultivation room 121, 122 of the cabinet 100.

That is, as the opening/closing door 130 is provided in the cabinet 100, the plant cultivation apparatus according to the embodiment of the present disclosure may be a closed-type cultivation apparatus. In particular, in the case of the closed-type cultivation apparatus, the plant cultivation apparatus may cultivate the plant while providing a sufficient amount of light and maintaining a predetermined temperature therein by the lighting module 401, 402, the circulation fan assembly 500, and the temperature control module 600, which will be described below.

Meanwhile, the opening/closing door 130 may be one of a rotary type opening and closing structure and a sliding type opening and closing structure. Further, the door 130 may be configured to block the front surface of the cabinet 100.

In the embodiment of the present disclosure, the opening/closing door 130 is configured as the rotary type opening and closing structure.

As an embodiment, the opening/closing door 130 may include a door frame 131 having a rectangular frame structure with an empty inside portion and a sight glass 132 blocking the empty inside portion of the door frame 131.

Preferably, the sight glass 132 may be formed of a transparent material, for example, may be formed of glass.

When the sight glass 132 is formed of glass, a protecting film (not shown) may be attached on the glass. The protecting film may be a light shading film (partially shading) that minimizes the leakage of light from the cultivation room indoors.

Instead of the protecting film, the sight glass 132 may have a dark color, so that the leakage of light indoors may be minimized.

In addition, the open/close door 130 may be composed of only a see-through window 132 without the door frame 131.

Next, the machine chamber frame 200 will be described.

The machine chamber frame 200 may constitute a bottom portion of the plant cultivation apparatus according to the embodiment of the present disclosure.

The machine chamber frame 200 may be extended from a lower portion of the outer case 110, as shown in FIG. 1. The machine chamber frame 200 may include a bottom plate 211 constituting a bottom of the machine chamber frame 200, side surface plates 212 constituting opposite side surfaces thereof, a rear surface plate 213 constituting a rear surface thereof, and an upper surface plate 214 constituting an upper surface thereof. That is, the machine chamber frame 200 may be formed in a box shaped structure that has an open front surface. In this case, the upper surface plate 214 may be provided as a bottom of the cultivation rooms 121 and 122 in the cabinet 100.

The machine chamber frame 200 may be configured such that an open lower surface of the outer case 110 is placed thereon and is coupled thereto.

The machine chamber frame 200 and the inner case 120 may be disposed to be spaced apart from each other and the side surface plates 212 and the rear surface plate 213 of the machine chamber frame 200 may be respectively configured to be connected to opposite side surfaces and a rear surface of the outer case 110.

Figure 6:
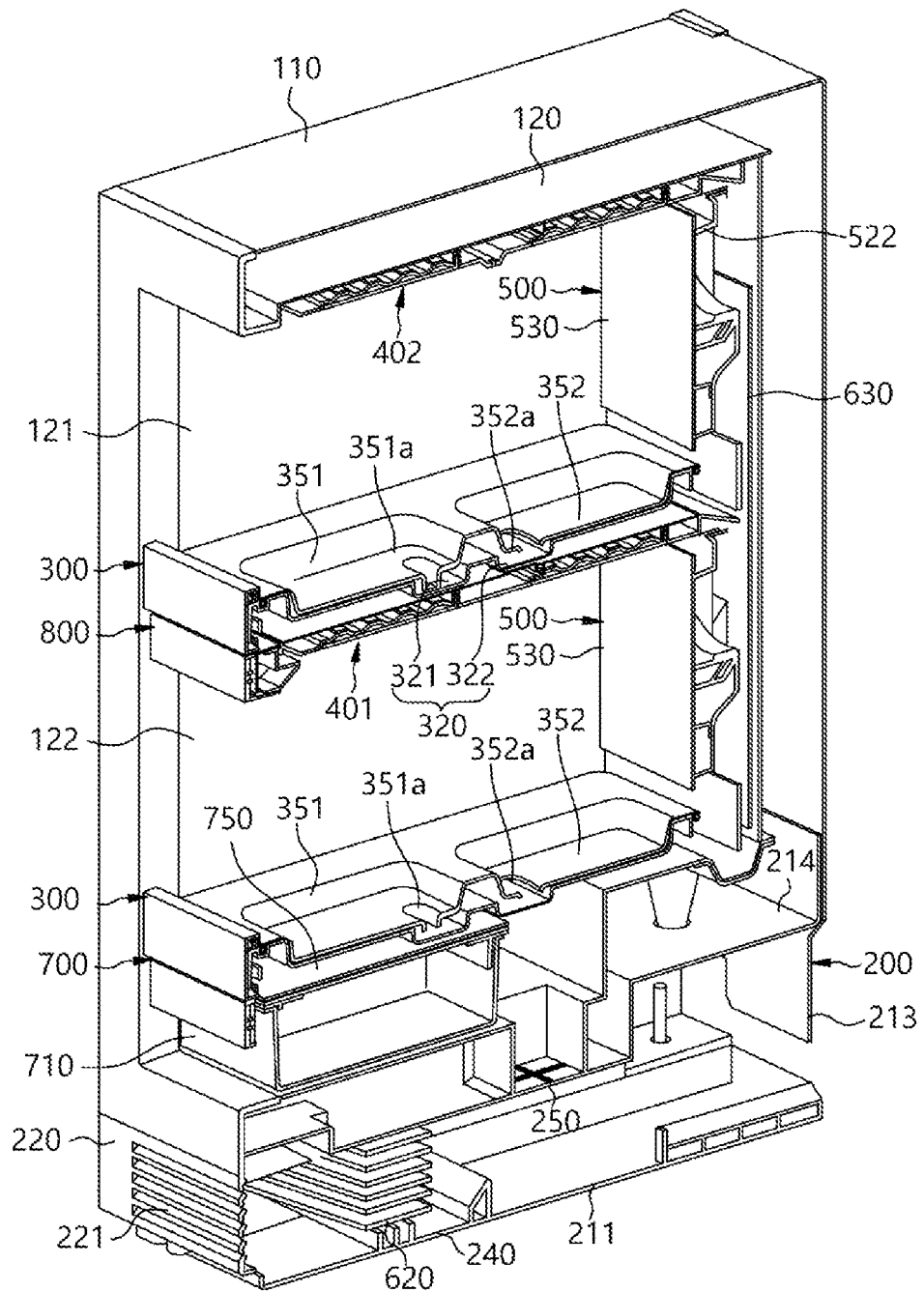
FIG. 6 is a sectioned-perspective view showing an internal structure of the plant cultivation apparatus according to the embodiment of the present disclosure.
Figure 7:
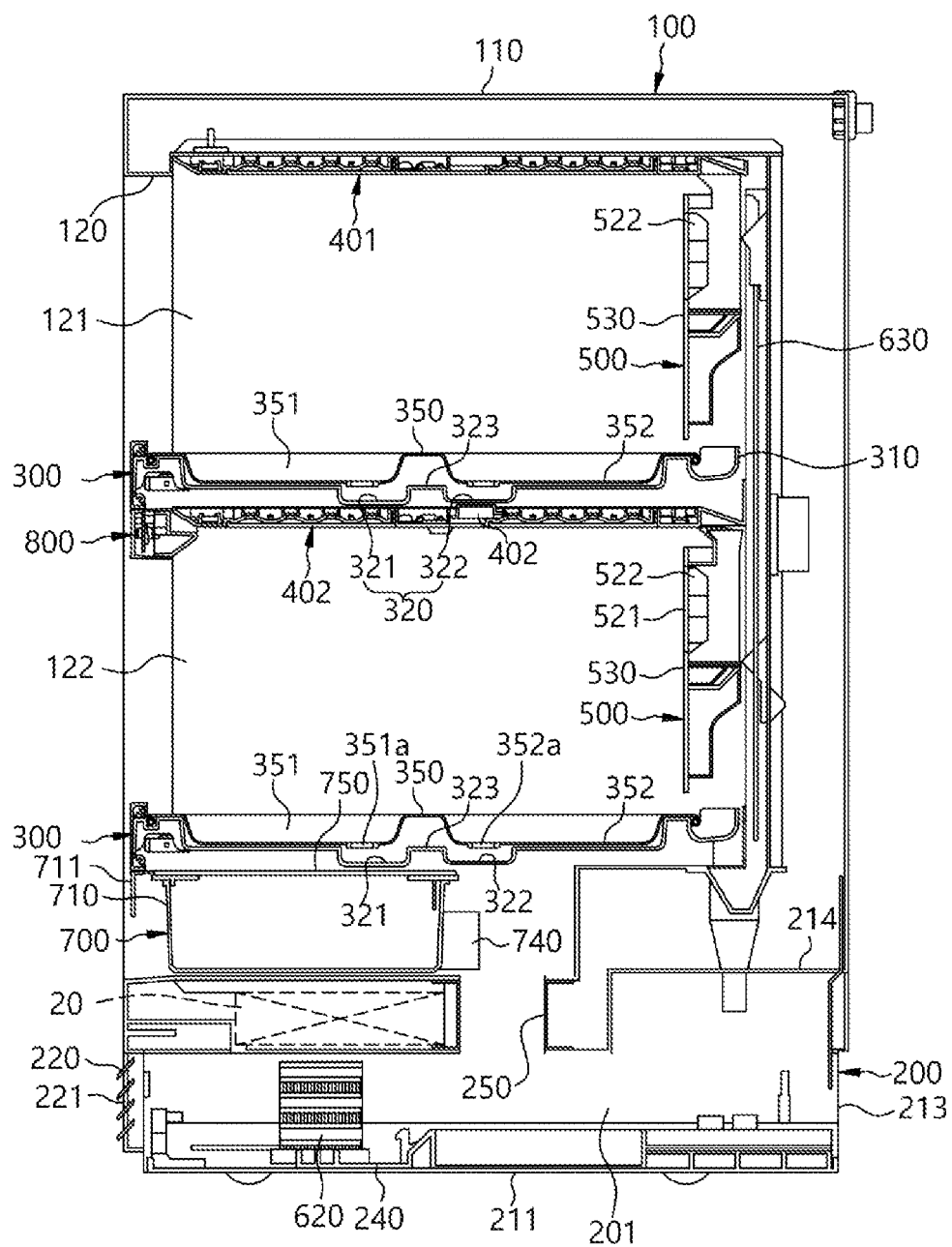
FIG. 7 is a side section view showing the plant cultivation apparatus according to the embodiment of the present disclosure.

The interior space of the machine chamber frame 200 may be provided as a machine chamber 201 (referring to FIG. 6).

That is, the machine chamber 201 and the cultivation rooms 121 and 122 may be respectively formed to have a space in the inner case 120 and a space in the machine chamber frame 200 which are separate from each other, thus providing independent spaces from each other.

A part of components of the temperature control module 600, which will be described below, may be provided in the machine chamber 201.

Although not shown in the drawings, the inner case 120 and the machine chamber frame 200 may be formed in a singly body. In this case, a separate partition for separating two spaces may be provided between the cultivation room 121, 122 and the machine chamber 201 so that the cultivation room 121, 122 and the machine chamber 201 may be formed to have spaces which are independent from each other.

Further, an intake and exhaust grill 220 may be provided on the open front surface of the machine chamber frame 200 that is the front of the machine chamber 201. That is, the intake and exhaust grill 220 may serve to guide airflow suctioned from the indoor into the machine chamber 201 or airflow discharged from the machine chamber 201 to the indoor and to block the open front surface of the machine chamber 201.

In addition, the intake and exhaust grill 220 may have an inlet 221 and an outlet 222. The inlet 221 and the outlet 222 may be separated from each other by being arranged at positions divided by a partition 230. In the embodiment of the present disclosure, the inlet 221 and the outlet 222 may be distinguished as the inlet 221 at the left and the outlet 222 at the right, when viewed from the front of the plant cultivation apparatus. This is as shown in FIGS. 1 and 2.

Further, the partition 230 dividing a space inside the machine chamber 201 into left and right sides may be provided in the machine chamber frame 200. That is, flow paths through which air flows into and is discharged from the machine chamber 201 may be divided by the partition 230.

A flow path through which air flows into the machine chamber 201 may be a space on the side on which the inlet 221 of the intake and exhaust grill 220 is positioned, and a flow path through which air is discharged from the machine chamber 201 may be a space on the side on which the outlet 222 of the intake and exhaust grill 220 is positioned.

In addition, the opposite spaces in the machine chamber 201 which are separated by the partition 230 may be configured to communicate with each other at a rear portion of the spaces. That is, a rear end portion of the partition 230 may be spaced apart from a rear wall surface in the machine chamber 201, not to be in contact therewith, so that the opposite spaces separated from each other may communicate with each other.

Although not shown in the drawings, an open hole (not shown) may be provided in the rear end portion of the partition 230 to allow the opposite spaces in the machine chamber 201 to communicate with each other.

Further, the partition 230 may be formed in a straight line shape, and may be formed in an inclined structure or a bent structure. In the embodiment of the present disclosure, the partition 230 is formed in the bent structure. That is, by bending a part of the partition 230 by bending, portions in which a condenser 620 and a compressor that will be described later are installed may be secured to be sufficiently large, compared to other portions.

Further, a condensed water reservoir 240 may be provided in the machine chamber 201 of the machine chamber frame 200. The condensed water reservoir 240 that is described above may be positioned at a bottom at the side where air flows into the machine chamber 201 through the inlet 221, and may server to receive condensed water flowing down from the condenser 620 and to fix the condenser 620 in the machine chamber.

Further, a heat exhaust opening 202 may be formed by penetrating the rear surface plate 213 of the machine chamber frame 200. The heat exhaust opening 202 may be a hole provided to discharge (or suction) air dissipating heat of the compressor. That is, the heat exhaust opening 202 is additionally provided, so that the discharge of air may be smoothly performed.

The bottom plate 211 of the machine chamber frame 200 may have a discharge hole 203 that is provided to discharge the air dissipating heat of the compressor.

Meanwhile, a rear portion of the upper surface plate 214 providing the machine chamber frame 200 may be formed to protrude upward more than other portions thereof, so that the rear portion of the inside of the machine chamber 201 may have a high space compared to other portions. That is, considering a protruding height of the compressor provided in the machine chamber 201, the rear portion of the machine chamber 201 may be formed higher than the other portions thereof.

Further, a controller 20 (referring to FIG. 6) may be provided at a front space between an upper surface of the upper surface plate 214 and a lower surface of the inner case 120, the lower surface thereof facing the upper surface of the upper surface plate 214, the controller 20 being provided to control operation with respect to each component of the plant cultivation apparatus. A circuit board having various control circuits may constitute the controller 20.

In particular, the machine chamber 201 and the cultivation room 121 or 122 are configured to communicate with each other by a communication passage 250. In this case, the communication passage 250 is formed as a tube having one end connected by passing through the upper surface plate 214 and connected by passing through the bottom surface of the inner case 120.

That is, a part of the air in the machine chamber 201 may be supplied into the cultivation chamber 121 or 122 by the communication passage 250 described above.

Next, the bed 300 will be described with reference to FIGS. 8 to 10 attached thereto.

Figure 8:
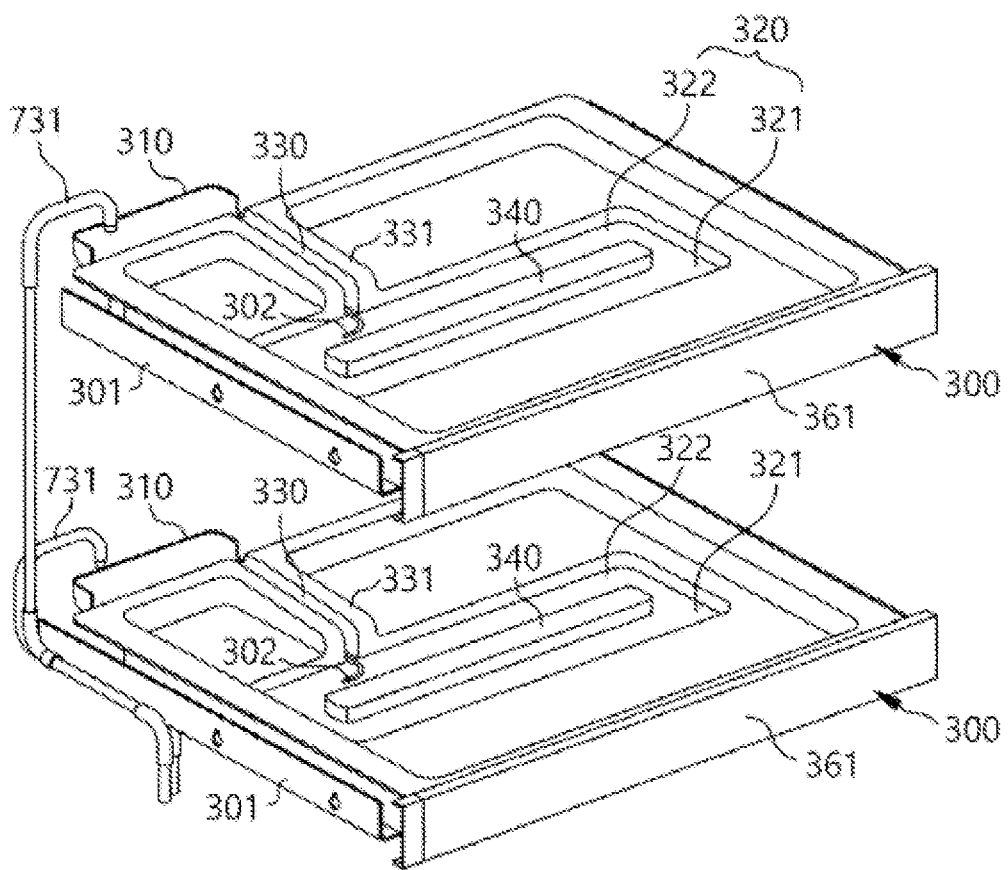
FIG. 8 is a perspective view showing a bed of the plant cultivation apparatus according to the embodiment of the present disclosure.
Figure 9:
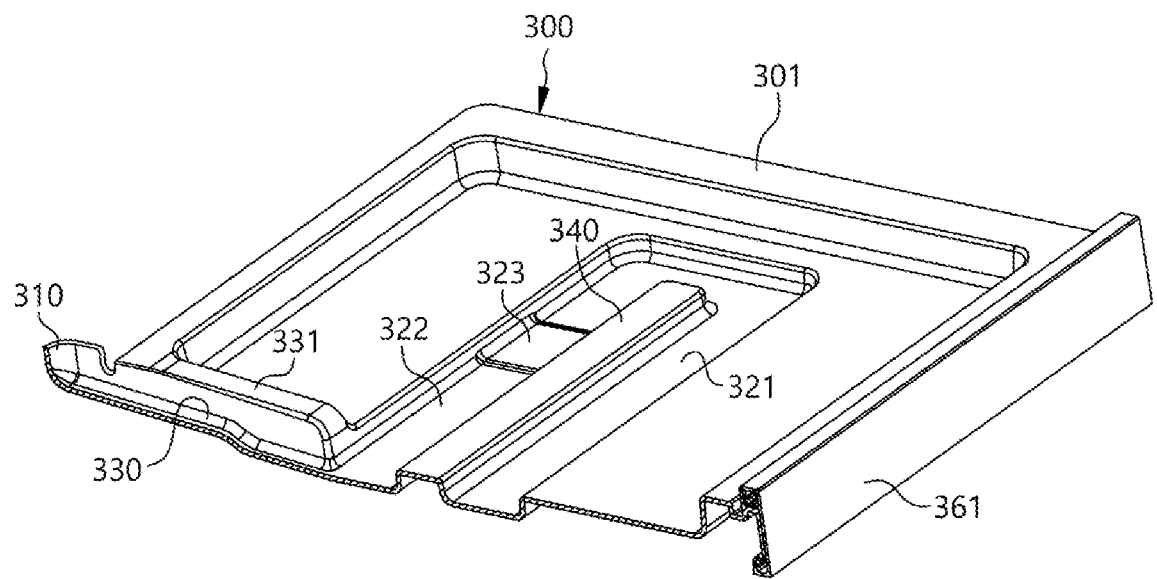
FIG. 9 is a sectioned-perspective view showing the bed of the plant cultivation apparatus according to the embodiment of the present disclosure.
Figure 10:
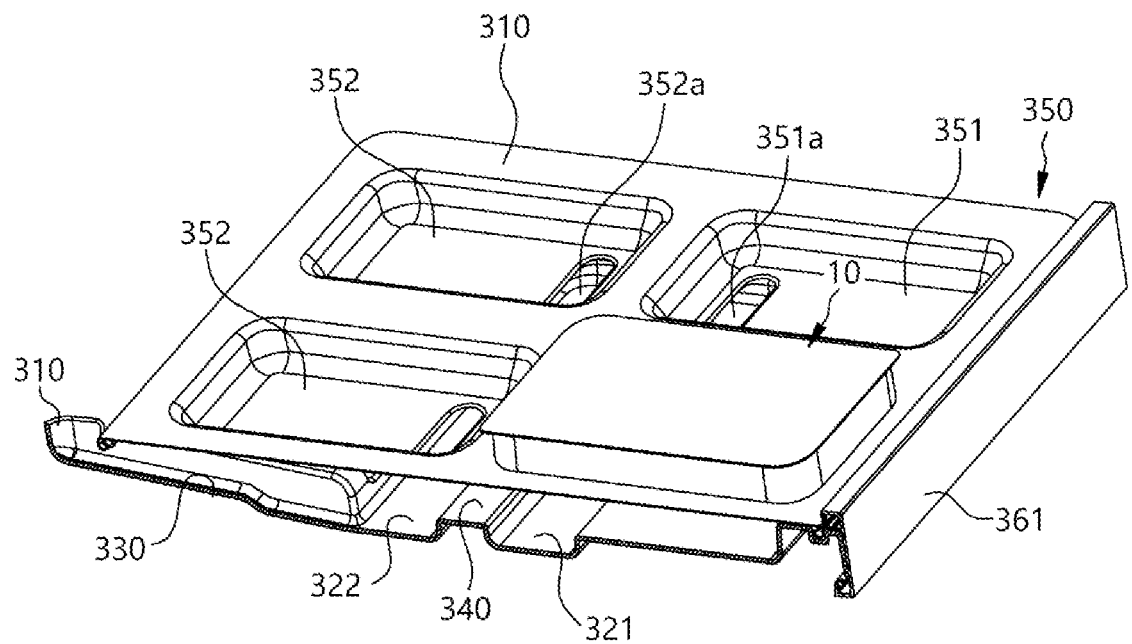
FIG. 10 is a sectioned-perspective view showing a coupled state between the bed, a bed cover, and the pod of the plant cultivation apparatus according to the embodiment of the present disclosure.

FIG. 8 is a perspective view showing a bed of the plant cultivation apparatus according to the embodiment of the present disclosure, FIG. 9 is a sectioned-perspective view showing the bed of the plant cultivation apparatus according to the embodiment of the present disclosure, and FIG. 10 is a sectioned-perspective view showing a coupled state between the bed, a bed cover, and the pod of the plant cultivation apparatus according to the embodiment of the present disclosure.

The bed 300 may be a part provided to place the pod 10 thereon.

The bed 300 may be formed in a tray structure having a flat plate shape or a circumference wall, and the bed 300 may be configured to store supply water on an upper surface thereof.

In particular, first guide rails 101 may be respectively provided on opposite wall surfaces (opposite wall surfaces in the inner case) in the cultivation room 121, 122. The first guide rails 101 may guide the bed 300 to be moved back and forth so that the bed 300 may be taken out from the cultivation room 121, 122 in a drawer manner.

Guide ends 301 may be provided on opposite wall surfaces of the bed 300. The guide ends 301 may be configured to be supported by the first guide rails 101, so that the bed 300 may be taken out from the cultivation room 121, 122 in the drawer manner. Through other various structures not shown, the bed 300 may be taken out from the cultivation room 121, 122 in the drawer manner.

Further, a water reservoir 310 may be provided in a rear surface of the bed 300. The water reservoir 310 may be a part receiving the supply water from the outside of the bed 300 and providing the supply water into the bed 300.

The water reservoir 310 may protrude rearward from either side portion of the rear surface of the bed 300. In addition, a bottom surface of the water reservoir 310 may be depressed downward thereby guiding the supply water to flow into a communicating portion with a supply water flow path 330, which will be described below.

In addition, at a center portion in the bed 300, a depression 320 that is depressed from a bottom in the bed 300 is provided. Thereby, the supply water supplied to the water reservoir 310 is guided by the supply water flow path 330 to be supplied to the depression 320.

The supply water flow path 330 is formed in a groove extended from the water reservoir 310 to the depression 320. Although not shown in the drawings, the supply water flow path 330 may be a separate pipe or hose from the bed 300.

In particular, the supply water flow path 330 may be formed in an inclined or round structure, the structure being gradually inclined downward as supply water flow path 330 goes from the water reservoir 310 to the depression 320. That is, by the above-described inclined or round structure, the supply of the supply water may be performed quickly and the supply water supplied to the depression 320 may be prevented from flowing back to the water reservoir 310.

In addition, bank parts 331 may be provided at opposite sides of the supply water flow path 330, the bank parts 331 being provided to precisely guide the supply water. That is, by the bank parts 331, the supply water supplied along the supply water flow path 330 may be smoothly supplied to the depression 320 without deviating from the supply water flow path 330.

Further, a dam part 340 may be formed on a center portion in the depression 320, the dam part 340 protruding upward from a surface of the depression 320. The dam part 340 may be formed in a long protrusion that is long in a left and right direction of the bed 300. Based on the dam part 340, the depression 320 may be divided into a front depression 321 and a rear depression 322.

That is, when a plurality of pods 10 are seated in rows of the front and rear of the bed 300, pods 10 at the front row are arranged to be in contact with the front depression 321 while the protrusion 12 of each of the front pods is positioned rearward, and pods 10 at the rear row are arranged to be in contact with the rear depression 322 while the protrusion 12 of each of the rear pods is positioned forward.

In particular, the dam part 340 may protrude from a bottom in the depression 320, thus the supply water does not remain. Further, the dam part 340 may serve to guide the supply water to be supplied to only a portion where the protrusion 12 of the pod 10 is positioned.

Further, a flow guidance groove 302 may be provided in a portion of the bottom surface in the depression 320, the portion communicating with the supply water flow path 330.

That is, the supply water flowing along the supply water flow path 330 may be guided by the flow guidance groove 302 in the process of flowing into the depression 320 to flow from one side of the depression 320 to another side thereof.

In addition, a sensing protrusion 323 may protrude from the bottom surface in the depression 320. An upper surface of the sensing protrusion 323 may be positioned higher than the bottom surface of the depression 320 and may be positioned lower than the bottom surface of the bed 300.

Meanwhile, a plurality of beds 300 (e.g. 300*a* and 300*b* in FIG. 3) may be provided. In this case, the beds 300 may be respectively provided in the cultivation rooms 121 and 122 while being vertically spaced apart from each other. Of course, although not shown, the beds 300 may be installed spaced apart from each other left and right.

A vertical distance between the beds 300 may be set differently in response to sizes in the cultivation rooms 121 and 122 or the type of plant to be cultivated. For example, as the first guide rails 101 that are provided on the opposite wall surfaces in the cultivation room 121, 122 are configured to be adjusted in vertical position, the vertical distance between the beds 300 may be adjusted as needed.

The bed 300 may have a bed cover 350.

The bed cover 350 may be a part where the pod 10 is seated at a precise position thereof. An upper surface of the bed cover 350 has a plurality of seating depressions 351 and 352 for the seating of each of the pods 10.

Each of the seating depressions 351 and 352 may have a width roughly equal to a width of the pod 10 and be depressed at a depth sufficient to partially receive the pod 10 therein. The bed cover 350 may be formed of a metal material, and in particular, it is preferable that the bed cover 350 is formed of stainless steel to prevent corrosion. The bed 300 may be formed of acrylonitrile, butadiene, styrene (ABS) resin.

In addition, the penetration hole 351*a*, 352*a* may be provided in the seating depressions 351, 352 to allow the protrusion 12 of the pod 10 to penetrate the seating depression 351, 352. That is, a user may place the pod 10 at the precise position thereof by checking positions of the penetration hole 351*a*, 352*a* and the protrusion 12.

In particular, the seating depressions 351 and 352 may be divided into a front row seating groove 351 on which each of the pods 10 at the front row is seated and a rear row seating depression 352 on which each of the pods 10 at the rear row is seated. A penetration hole 351*a* of the front row seating depression 351 and a penetration hole 352*a* of the rear row seating depression 352 may be arranged adjacent to each other. That is, when the bed cover 350 is seated on the bed 300, the penetration holes 351*a* and 352*a* may be respectively positioned at the front depression 321 and the rear depression 322 of the bed 300.

Further, a handle 361 may be provided in a front surface of the bed 300. The user can take out or reinstall the bed 300 in the drawer manner by using the handle 361.

The handle 360 may be configured such that a front surface thereof is not in contact with an inside surface of the opening/closing door 130, thus a gap may be provided between the front surface of the handle 360 and the opening/closing door 130. That is, through the gap, air may flow between a lower cultivation room 121 and an upper cultivation room 122, and air flowing through the lower cultivation room 122 may be discharged outward of the plant cultivation apparatus through the gap.

Through the flow of air passing through the gap, a surface of the open/close door 130 may be prevented from condensation.

Referring to FIG. 6 again, the lighting module 401, 402 may be a part emitting light to the pod 10 seated on the bed 300 in the cultivation room 121, 122. That is, as the lighting module 401, 402 is provided in the plant cultivation apparatus, the plant cultivation apparatus may continue to provide light to the plant, in spite of being the closed-type cultivation apparatus.

In the embodiment, the lighting module 401, 402 may be a light emitting diode (LED) 421 and be configured to emit light.

Further, a residual water detection sensor 440 may be provided on the upper surface of the second lighting module 402. The residual water detection sensor 440 may detect residual water remaining in the depression 320 of the bed 300 accommodated in a upper cultivation space.

In particular, the residual water detection sensor 440 may be positioned in a portion in which the sensing protrusion 323 is formed in a lower portion of the bed 300 and sense whether or not the residual water remains on the upper surface of the sensing protrusion 323, thereby determining the residual water in the depression 320.

The residual water detection sensor 440 may be configured of a capacitance-type sensor and accurately detect the residual water in the depression 320.

The residual water detection sensor 440 may be configured of other methods not shown in the drawings. For example, the second residual water detection sensor 440 may be configured as a mechanical sensor such as a floating method or an electronic sensor using two electrodes.

A temperature sensor (not shown) may be provided on the upper surface of the second lighting module 402. The temperature sensor may serve to detect the temperature in the cultivation room 121, 122 and allow the air temperature to be controlled by the temperature control module (not shown).

The circulation fan assembly 500 may be provided to circulate air in the cultivation room 121, 122.

Meanwhile, the circulation fan assembly 500 may be provided for each of the cultivation rooms 121 and 122, or the single circulation fan assembly 500 may be configured to control air circulation to all the cultivation rooms 121 and 122.

The circulation fan assembly 500 may include circulation fans 510, the fan guide 520, and a partition wall 530.

The circulation fans 510 may be fans driven to blow air. The circulation fans 510 may be radial flow fans that suction air in a shaft direction thereof and blows the air in a radial direction.

Further, the fan guide 520 may be a part guiding a flow of air blown by the circulation fans 510 as the circulation fans 510 is provided in the cultivation room.

The fan guide 520 may have an installation hole 521 formed by penetrating the fan guide 520, the installation hole being provided to receive the circulation fans 510. The shroud 520 may have an air guide 522 at a front surface thereof, the air guide 522 guiding air suctioned through the circulation fans 510 from a rear space in the cabinet 100 to flow into the cultivation room 121, 122. The air guide 522 may be configured to guide air blown in the radial direction of the circulation fans 510 to flow to the upper space in the cultivation room 121, 122.

Further, the partition wall 530 may be a part that is positioned at the front of the fan guide 520 and blocks the fan guide 520 from the cultivation room 121, 122.

The temperature control module may be configured to control the temperature of air circulating in the cultivation room 121 or 122 of the inner case 120.

The temperature control module may include a refrigeration system including a compressor (not shown), a condenser 620 and an evaporator 630. That is, the temperature of the air circulating in the cultivation room 121 or 122 may be adjusted by the refrigeration system.

Figure 11:
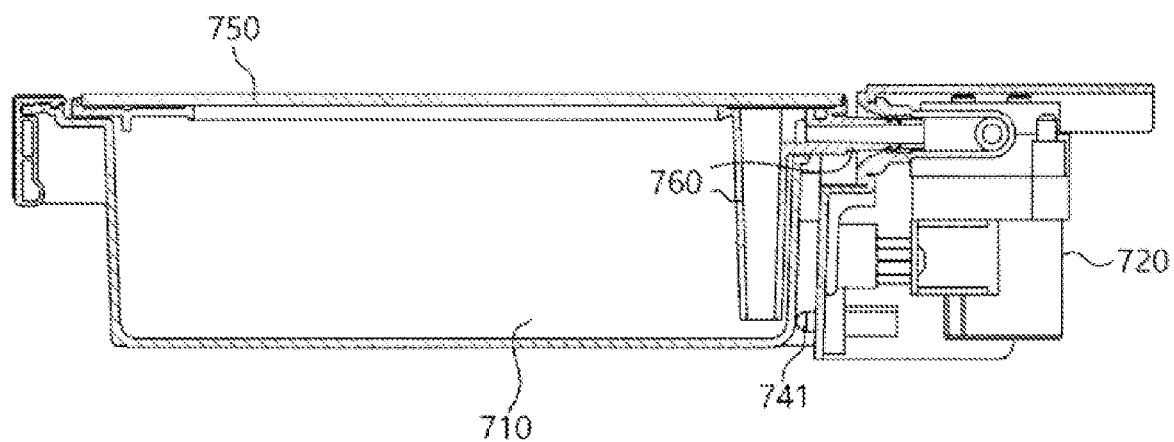
FIG. 11 is a side view showing a state in which an opening and closing cover of a water supply module of the plant cultivation apparatus according to the embodiment of the present disclosure is opened.
Figure 12:
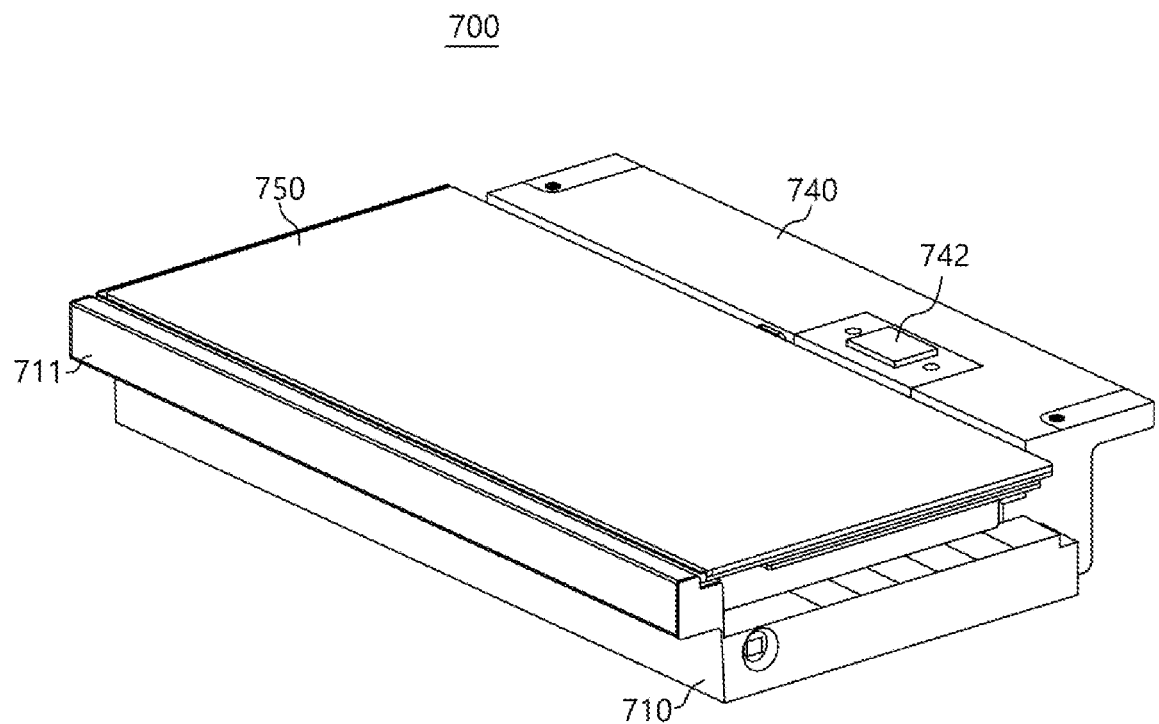
FIG. 12 is a perspective view showing a state in which a water tank of the water supply module of the plant cultivation apparatus according to the embodiment of the present disclosure is coupled to an installation frame.
Figure 13:
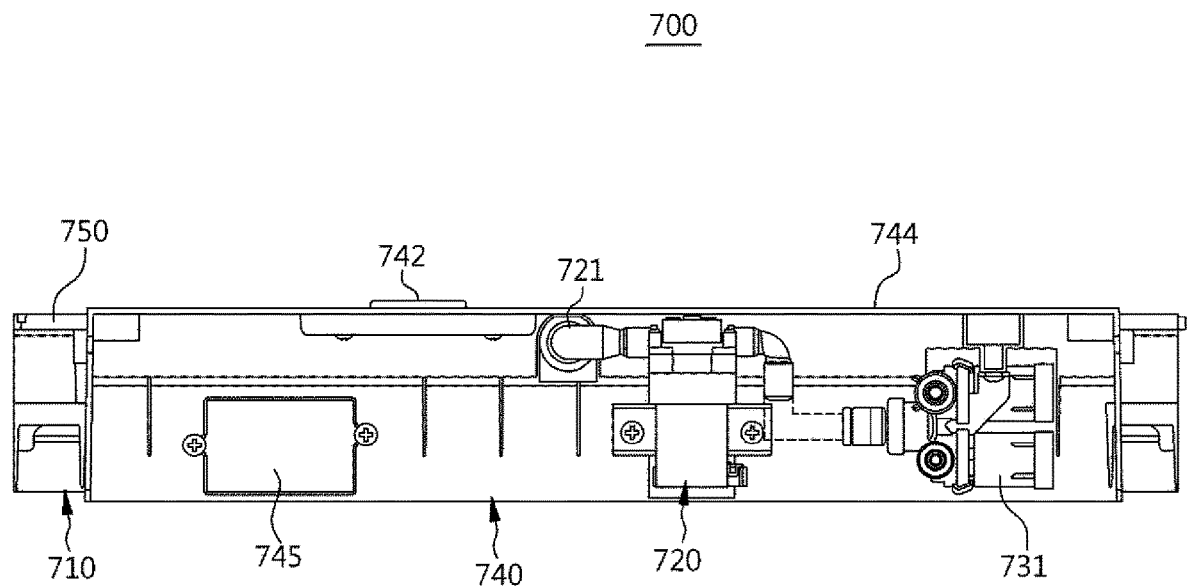
FIG. 13 is a section view showing a state in which the water tank of the water supply module of the plant cultivation apparatus according to the embodiment of the present disclosure is coupled to the installation frame.

Next, the water supply module 700 will be described with reference to FIGS. 11 and 12.

The water supply module 700 may be provided to supply the supply water to the bed 300.

In the embodiment of the present disclosure, the water supply module 700 that stores the supply water in advance may pump enough supply water to the bed 300 when the water supply is needed.

That is, in the conventional cultivation apparatus, the method of supplying the supply water of the required amount is not used, but a method of storing enough supply water in a water storage and supplying the stored supply water to soil by using an absorbing member is used. Herein, the supply water is mixed with a nutrient solution, so that a problem with contamination of the supply water may occur.

However, in the embodiment of the present disclosure, nutrient components may be contained in the culture ground 11 of the pod 10. The supply water of the required amount may be supplied to the pod to prevent residual water from existing in portions other than a water tank 710, so that odor due to contamination of the supply water may be fundamentally prevented.

The water supply module 700 may include the water tank 710, a water pump 720, and an supply hose 730.

The water tank 710 may be a part in which the supply water is stored.

The water tank 710 may be formed in a rectangular box structure with an open upper portion, and be positioned between the bottom of the inner case 120 and the bed 300. That is, considering that a gap may be provided between the bottom 123 of the inner case 120 and the bed 300 because the upper surface plate 214 of the machine chamber frame 200 partially protrudes upward due to the height of the compressor 610 in the machine chamber 201, the water tank 710 may be positioned in the gap so that the cultivation space of the cultivation room 121 or 122 may be formed to be large enough.

Further, the water tank 710 may be positioned in the front space in the cabinet 100 and be provided to be drawable from the cabinet 100. That is, considering that the rear portion of the machine chamber 201 may be formed to be higher than the other portion due to the height of the compressor, the water tank 710 may be provided in a front portion of a lower portion in the inner case 120 provided due to the upward protruding portion of the machine chamber 201. On the opposite side wall surfaces of the cabinet 100, second guide rails 102 may be provided to guide back and forth movement of the water tank 710.

In addition, the water tank 710 may be configured to be exposed to the indoor when the opening/closing door 130 is opened. That is, the open/close door 130 may be configured to block not only the cultivation room 121, 122 but also the water tank 710, so that the water tank 710 may be exposed outward when the opening/closing door 130 is opened. Thereby, the user can easily take out the water tank 710 to supply the supply water.

The water tank 710 may have a handle 711 at a front surface thereof, and the user can take out and reinstall the water tank 710 by using the handle 711 in a drawer manner.

In particular, the handle 711 of the water tank 710 may be also configured not to be in contact with the opening/closing door 130 like the handle 360 of the bed 300. Thus, a gap may be provided between a front surface of the handle 711 and the opening/closing door 130.

Next, the water pump 720 may be a part pumping the supply water in the water tank 710.

The water pump 720 may be positioned in a space on the rear side of a portion where the water tank 710 is installed in a lower space of the inner case 120.

In particular, an installation frame 740 may be provided between the water tank 710 and the water pump 720, and the water pump 720 may be fixed on a rear surface of the installation frame 740. That is, when the water tank 710 is taken out, the installation frame 740 may prevent the water pump 720 from being exposed outward and allow the water pump 720 to be fixed in a precise position thereof. Further, a sensing part 741 detecting whether or not the water tank 710 is taken out may be provided on a front surface of the installation frame 740.

In this case, a coupling hole 743 is formed to pass through the installation frame 740, and a pump connection pipe 721 connecting the coupling hole 743 and the water pump 720 is provided on the rear surface of the installation frame 740.

Further, the installation frame 740 may be provided with a sensing part 741 for detecting whether or not the water tank 710 is taken out. In this case, the mounting detection unit 741 may include a contact switch to determine that the water tank 710 is mounted when the water tank 710 contacts the corresponding mounting detection unit 741 to turn on the contact.

Of course, the mounting detection unit 741 may include a proximity sensor, and may be configured variously, such as, to determine that the corresponding water tank 710 is mounted when the water tank 710 is adjacent thereto.

In addition, the installation frame 740 is provided with a water level detection sensor 745 for detecting a water level of feed water in the water tank 710. That is, the water level detection sensor 745 may allow a user to accurately recognize when to replenish the feed water.

Meanwhile, an upper surface frame 744 may be formed to be bent backward at the upper end of the installation frame 740 to cover the upper surface of the water pump 720. That is, the upper surface frame 744 may prevent the water pump 720 from being damaged by blocking the upper surface of the water pump 720 from the bottom of the bed 300 in the cultivation room 121 or 122.

In addition, a residual water detection sensor 742 may be mounted on the upper surface frame 744 to detect residual water remaining in the depression 320 of the bed 300 positioned above the upper surface frame 744.

The residual water detection sensor 742 may be installed to protrude upward from the upper surface of the upper surface frame 744. That is, the residual water detection sensor 742 may be installed to be as close as possible to the bed 300 to accurately detect the residual water in the depression 320 of the bed 300.

In particular, the residual water detection sensor 742 may be positioned in a portion where a sensing protrusion 323 is formed in the bottom of the bed 300 to detect whether residual water is present on the surface of the sensing protrusion 323.

This structure may allow the residual water detection sensor 742 to be installed as close as possible to the surface of the sensing protrusion 323 to more accurately determine whether to further replenish feed water based on the presence or absence of residual water on the surface of the sensing protrusion 323 and the water absorption amount of each pod.

The residual water detection sensor 440 may be configured of a capacitance-type sensor and accurately detect the residual water in the depression 320.

Of course, the residual water detection sensor 742 may be configured as a mechanical sensor such as a floating method or an electronic sensor using two electrodes.

Next, the supply hose 730 may be a coupling hose for supplying the feed water pumped by the water pump 720 to the bed 300.

The supply hose 730 may be provided such that a first end thereof is connected to the water pump 720 and a second end thereof is positioned directly above the water reservoir 310 of the bed 300.

In particular, a flow path valve 731 may be connected between the supply hose 730 and the water pump 720. That is, the feed water pumped by the water pump 720 may be selectively supplied to the water reservoir 310 of each bed 300 by the flow path valve 731. The flow path valve 731 may be controlled to open and close electronically. The flow path valve 731 may be opened to supply water pumped by the water pump 720 to each bed 300. The flow path valve 731 may be a solenoid valve that is controlled electromagnetically.

Next, the supply hose 730 may be a coupling hose for supplying the feed water pumped by the water pump 720 to the bed 300.

The supply hose 730 may be provided such that a first end thereof is connected to the water pump 720 and a second end thereof is positioned directly above the water reservoir 310 of the bed 300.

Meanwhile, an open upper surface of the water tank 710 constituting the water supply module 700 may be configured to be opened and closed by an opening and closing cover 750.

In addition, the opening and closing cover 750 may be provided with a water supply connection tube 760 connected to the water pump 720 so that the supply water stored in the water tank 710 may be transferred to the water pump 720. That is, the water pump 720 may be configured to be selectively connected to the water tank 710 by the water supply connection tube 760, not configuration of being directly connected to the water tank 710. Thus, only the water tank 710 may be taken out from the cabinet 100.

The plant cultivation apparatus according to the embodiment of the present disclosure may include a display module 800.

The display module 800 may be provided to display each condition of the plant cultivation apparatus and to perform various controls.

Each condition displaying by the display module 800 may be the temperature in the cultivation room 121, 122, cultivation time, operational states.

Further, the display module 800 may be configured to be operated in a touchable manner, or may be configured to be operated by a button or a switch.

In particular, the display module 800 may be provided in the cabinet 100 or in the opening/closing door 130.

However, when the display module 800 is provided in the opening/closing door 130, the connection structure of various signal lines or power lines may be inevitably complicated.

Considering that, the display module 800 may be preferably provided in the cabinet 100.

Hereinafter, a configuration and method for supply water to plants in the plant cultivation apparatus according to the embodiment of the present disclosure described above will be described with reference to FIGS. 14 to 17.

Figure 14:
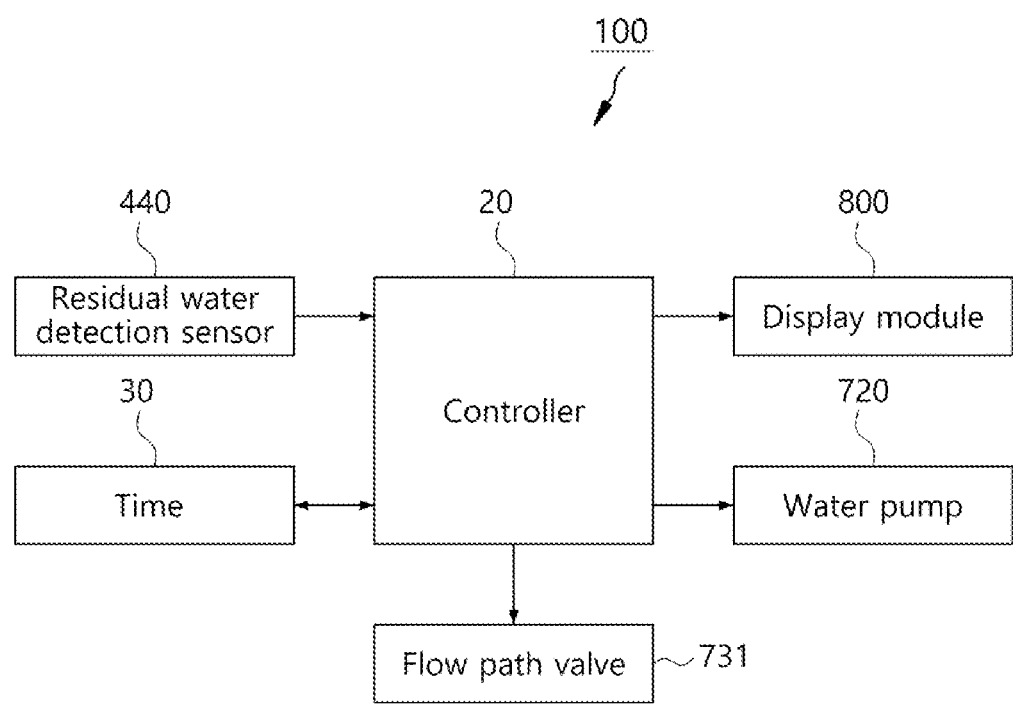
FIG. 14 is a view shoving a block configuration diagram of a plant cultivation apparatus according to an embodiment of the present disclosure.

FIG. 14 is a view shoving a block configuration diagram of a plant cultivation apparatus according to an embodiment of the present disclosure.

Referring to FIG. 14, the plant cultivation apparatus is configured to periodically supply water to plants. Specifically, the plant cultivation apparatus may supply water to a plurality of beds 300 a predetermined number of times at a predetermined cycle.

To this end, the plant cultivation apparatus may include a controller 20, a timer 30, a residual water detection sensor 440, a water pump 720, a flow path valve 731, and a display module 800.

The water pump 720 is a pump that pumps water in the water tank 710. The water in the water tank 710 may be pumped and supplied to each bed. The water pumped from the water tank 710 may be supplied to each bed through a flow path valve 731. That is, when there are a plurality of beds, a plurality of flow path valves 731 may be installed respectively. The flow path valve 731 may be a solenoid valve that can be electromagnetically controlled by the controller 20. When water is to be supplied to each bed, the controller 20 may open the flow path valve 731 so that the water pumped from the water tank 710 is be supplied to the bed.

As described above, the residual water detection sensor 440 may serve to detect the residual water remaining in the depression 320 of the bed 300. For example, the residual water detection sensor 440 may determine whether water is present in the bed 300 and output a result of the determination to the controller 20.

When a specified water supply period is reached, the timer 30 may inform the controller 20 that the specified water supply cycle is reached. For example, when the water supply cycle is reached, the timer 30 may inform the controller 20 that the cycle is reached. The timer 30 may be implemented by being integrated into the controller 20, and is not an essential component of the present disclosure.

When the controller 20 is informed by the timer 30 that the specified water supply cycle has been reached, the control unit 20 may start a water supply process.

In this case, the controller 20 may determine whether the plant cultivation apparatus is able to perform the water supply process.

Specifically, the controller 20 does not perform the water supply process unless the water tank 710 is mounted in place.

As described above, the mounting detection unit 741 which detects whether the water tank 710 is taken out may be provided on the front side of the installation frame 740. The mounting detection unit 741 may be configured by a proximity sensor to detect that the water tank 710 is mounted when the water tank 710 is adjacent to the mounting detection unit 741.

The controller 20 may identify whether the water tank 710 is mounted in place based on a result of the detection from the detection unit 741. The controller 20 does not perform the water supply process when the water tank 710 is not mounted in place.

In addition, the controller 20 may determine whether feed water is present in the water tank 710. Although not shown in FIG. 11, a water sensor capable of detecting whether water is present in the water tank 710 may be installed in the water tank 710. The water sensor may detect whether water that is to be supplied to the bed 300 is present in the water tank 701. The water sensor may output a result of the detection to the controller 20. Also, the controller 20 does not perform the water supply process no water is present in the water tank 710.

In addition, the controller 20 may determine whether the opening/closing door 130 of the cabinet 100 is closed. Although not shown in the drawings, a sensor capable of determining whether the opening/closing door 130 is open or closed may be provided on the opening/closing door 130.

The controller 20 does not perform the water supply process when the opening/closing door 130 is opened In a case where the controller 20 is to perform the water supply process since a specified water supply cycle is reached, the display module 800 may display a cause why the water supply process is not to be performed when a condition for performing the water supply process is not satisfied.

The user may check the cause why the water supply process is not to be performed through the display module 800 and remove the cause.

The controller 20 may perform the corresponding water supply process when the cause why the water supply process is not to be performed is removed.

When the water supply process is performed, the controller 20 may identify the position of a bed on which water supply is to be performed. When there are a plurality of beds, the controller 20 may perform a water supply operation on the plurality of beds sequentially. For example, when there are a first bed and a second bed, the controller 20 may perform the water supply operation on the first bed and then perform the water supply operation to the second bed.

When the bed to be watered is identified, the controller 20 may determine whether no water is present in the bed, and determine whether there is a water supply delay. The water supply delay may include a case where water supply is in progress to the bed.

In addition, the controller 20 may determine whether the number of times of water supply for the corresponding bed, which is counted is less than or equal to a predetermined value.

That is, the number of times of water supply may be fixed for each bed. The number of times of water supply may vary depending on which plants are grown and may be not a fixed value. When the water supply operation has been performed on the corresponding bed the specified number of times, the controller 20 does not perform the water supply operation on the bed.

When the water supply operation has been performed on the bed less than the specified number of times, the controller 20 may perform the water supply operation on the bed.

The water supply operation will be described as follows.

When the water supply operation is started, the controller 20 may perform the water supply operation once for a predetermined bed. When the water supply operation is performed, the controller 20 may turn on the water pump 720 and also open the flow path valve 731 installed in the bed to be watered to supply water to the bed.

The controller 20 may adjust a watering amount by a driving time of the water pump 720 and an opening time of the flow path valve 731.

A single watering amount may be, for example, 150 ml. In this case, the controller 20 may drive the water pump 720 for 16 seconds and open the flow path valve 731 when the water pump 720 is driven. However, embodiments of the present disclosure are not limited thereto, and it will be apparent to those skilled in the art that the single watering amount may vary according to various conditions.

The controller 20 may wait for a water supply delay time each time the water supply operation is performed. The water supply delay time may correspond to, for example, a time during which at least one pod located in the corresponding bed is able to absorb water. For example, the water supply delay time may be 30 seconds. In addition, when the water supply operation is performed once, the controller 20 may increase the number of times of water supply by adding one to the number of times of water supply for the bed.

Subsequently, the controller 20 may identify a position of a bed for which the next water supply operation is to be performed after performing a water supply operation for a predetermined bed.

The controller 20 may terminate the water supply process when a condition for terminating the water supply process is satisfied. For example, the controller 20 may terminate the water supply process when the water supply operation has been performed for the plurality of beds a specified number of times.

Alternatively, when a predetermined time has elapsed from the time when water is detected in each bed, the controller 20 may terminate the water supply process even though the water supply operation has not been performed the specified number of times. To this end, when water is detected in a predetermined bed, the controller 20 may obtain a time which has elapsed from the time point when water is detected. When the obtained time is, for example, 30 minutes or more, the controller 20 may terminate the water supply process for the bed.

The controller 20 may perform the water supply operation for each bed until a condition for terminating the water supply process is satisfied.

Figure 15:
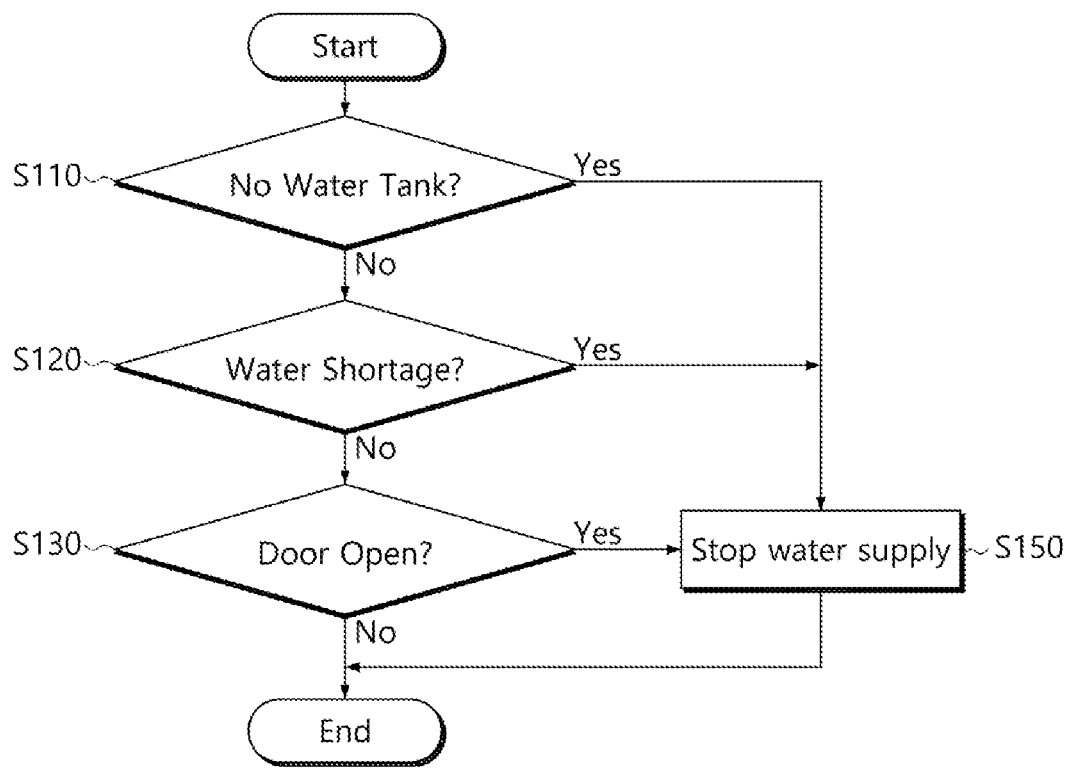
FIG. 15 is a flowchart of a method of determining whether a plant cultivation apparatus is in a state capable of performing a water supply process according to an embodiment of the present disclosure.

FIG. 15 is a flowchart of a method of determining whether a plant cultivation apparatus is in a state capable of performing a water supply process according to an embodiment of the present disclosure.

Referring to FIG. 15, the plant cultivation apparatus may start a water supply process when a specified water supply cycle is reached. In this case, the plant cultivation apparatus may determine whether or not plant cultivation apparatus is able to perform the water supply process before starting the water supply process.

First, the plant cultivation apparatus may determine whether the water tank 710 is mounted in place in step S110.

As described above, the plant cultivation apparatus may determine that the water tank 710 is mounted in place through the mounting detection unit 741 installed on the front surface of the installation frame 740 to detect whether the water tank 710 is taken out. When the water tank 710 is not mounted in place, the plant cultivation apparatus may terminate the water supply process in step S150.

When the water tank 710 is mounted in place, the plant cultivation apparatus may determine whether water is present in the water tank 710 in step S120. When no water is present in the water tank 710, the water supply process is terminated in step S150.

When water is present in the water tank 710, the plant cultivation apparatus may determine whether the opening/closing door 130 of the cabinet 100 is closed in step S130. When the opening/closing door 130 of the cabinet 100 is opened, the water supply process is terminated in step S150.

The plant cultivation apparatus does not perform the water supply process when the water tank 710 is not mounted in place, no water is present in the water tank 710, or the opening/closing door 130 of the cabinet 100 is opened.

In a case where the plant cultivation apparatus is to perform the water supply process since a specified water supply cycle is reached, the plant cultivation apparatus may display a cause why the water supply process is not to be performed, through the display module 800 when the plant cultivation apparatus is disable to perform the water supply process.

The user may check the cause why the water supply process is not to be performed through the display module 800 and remove the cause.

Figure 16:
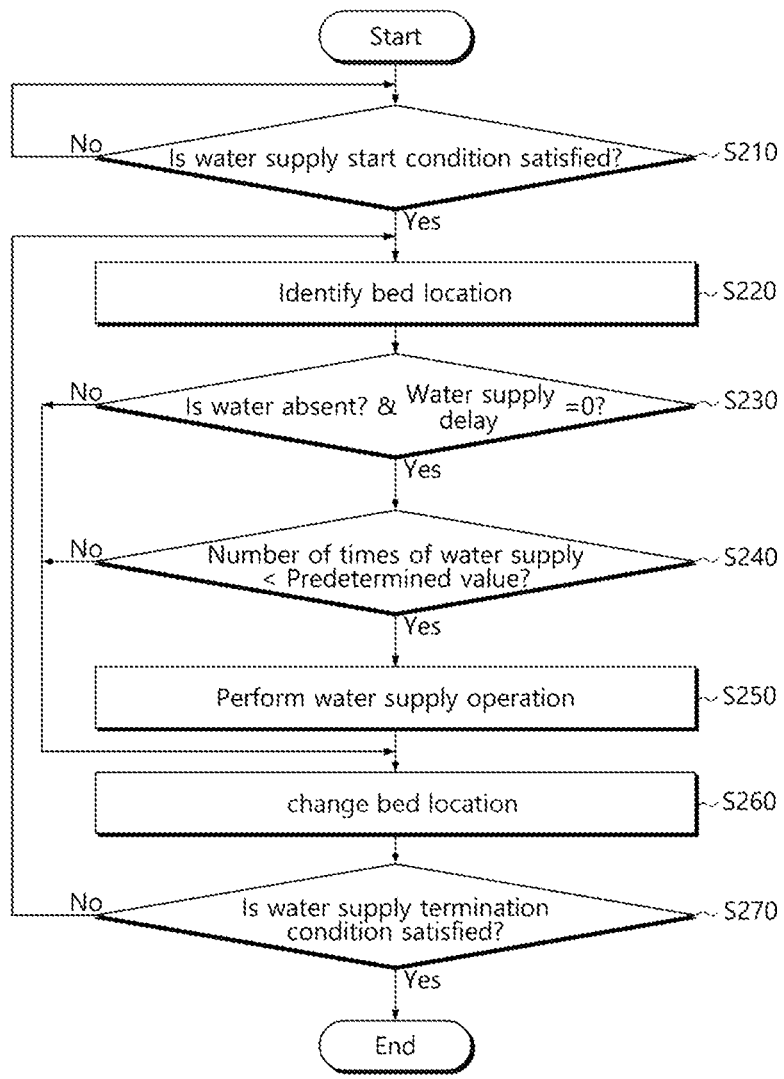
FIG. 16 is a flowchart of a water supply process performed in a plant cultivation apparatus according to an embodiment of the present disclosure.

FIG. 16 is a flowchart of a water supply process performed in a plant cultivation apparatus according to an embodiment of the present disclosure.

Referring to FIG. 16, the plant cultivation apparatus first may determine whether a water supply start condition is satisfied in step S210. The water supply start condition may be, for example, a condition that a specified water supply cycle has been reached. Alternatively, the user may instruct to perform a water supply process. For example, the user may first place seeds or seedlings in the plant cultivation apparatus and instruct the execution of the water supply process.

When the water supply start condition is satisfied, the plant cultivation apparatus may identify the position of a bed on which the water supply process is to be performed in step S220. When there are a plurality of beds, the plant cultivation apparatus may sequentially perform a water supply operation on the plurality of beds. For example, when there are a first bed and a second bed, the plant cultivation apparatus may perform the water supply operation on the first bed and then perform the water supply operation to the second bed.

When the bed to be watered is identified, the plant cultivation apparatus may determine whether no water is present in the bed in step S230, and determine whether there is a water supply delay. The water supply delay may include a case in which the water supply operation is in progress on the bed.

When water is present in the bed, the plant cultivation device does not perform the water supply operation on the corresponding bed. That is, the plant cultivation apparatus may skip the water supply operation for the corresponding bed, and change the position of the bed to be watered in step S260. In addition, the plant cultivation apparatus proceeds to step S260 when the water supply delay occurs for the bed.

When no water is present in the bed and there is no water supply delay, the plant cultivation apparatus may determine whether the number of times of water supply is less than or equal to a predetermined value in step S240.

As described above, the number of times of water supply is determined for each bed. The number of times of water supply may vary depending on which plants are grown and may be not a fixed value. When the water supply operation has been performed on the corresponding bed the specified number of times, the plant cultivation apparatus does not perform the water supply operation on the bed.

When the water supply operation has been performed on the bed less than the specified number of times, the plant cultivation apparatus may perform the water supply operation on the bed. The specified number of times may be 14 times.

The water supply operation will be described with reference to FIG. 17.

Figure 17:
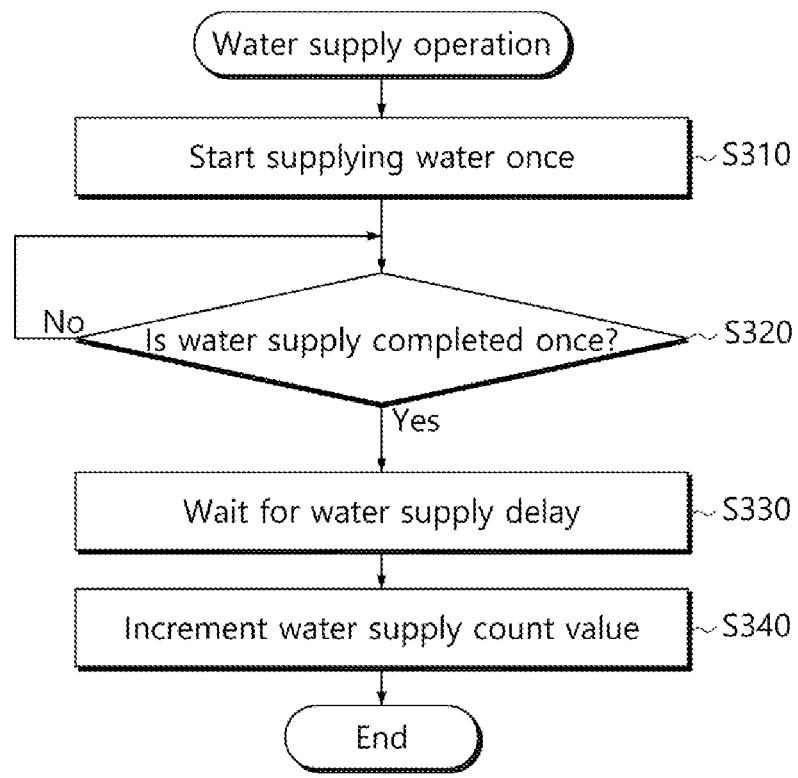
FIG. 17 is a flowchart of a water supply operation according to an embodiment of the present disclosure.

FIG. 17 is a flowchart of a water supply operation according to an embodiment of the present disclosure.

When the water supply operation is started, the plant cultivation apparatus may supply water to a bed once, the bed being determined as described above in step S310. In the case of water supply, the plant cultivation apparatus may turn on the water pump 720 and also open the flow path valve 731 installed in the bed to be watered to supply water to the bed. For example, water supply may mean supplying water of a predetermined watering amount, for example, water of a single watering amount to the bed 300.

Subsequently, the plant cultivation apparatus may determine whether watering is completed once in step S320.

The plant cultivation apparatus may adjust a watering amount by a driving time of the water pump 720 and an opening time of the flow path valve 731.

The single watering amount may be, for example, 150 ml. In this case, the plant cultivation apparatus may drive the water pump 720 for 16 seconds and open the flow path valve 731 when the water pump 720 is driven. Therefore, the single water supply operation may take a predetermined time. However, embodiments of the present disclosure are not limited thereto, and it will be apparent to those skilled in the art that the single watering amount may vary according to various conditions.

The plant cultivation apparatus may control the water pump 720 and the flow path valve 731 for a predetermined period of time to supply a desired amount of water to a corresponding bed.

The plant cultivation apparatus may wait for a water supply delay time in step S330 when watering is completed once. Specifically, the plant cultivation apparatus may wait for the water supply delay time each time the water supply operation is performed once. The water supply delay time may correspond to, for example, a time during which at least one pod located in the corresponding bed is able to absorb water. For example, the water supply delay time may be 30 seconds.

Thereafter, when the water supply operation is performed once, the plant cultivation apparatus may increase the number of times of water supply by adding one to the number of times of water supply for the bed in step S340. That is, the number of times of water supply may be increased by one.

The plant cultivation apparatus may perform the water supply operation according to the flowchart of FIG. 16.

Referring back to FIG. 16, after performing the water supply operation on the corresponding bed, the plant cultivation apparatus may determine a position of the bed on which the next water supply operation is to be performed in step S260.

Then, the plant cultivation apparatus may terminate the water supply process when the condition for terminating the water supply process is satisfied in step S270.

For example, the plant cultivation apparatus may terminate the water supply process when the water supply operation has been performed for the plurality of beds a specified number of times. Alternatively, when a predetermined time has elapsed from the time when water is detected in each bed, the plant cultivation apparatus may terminate the water supply process even though the water supply operation has not been performed the specified number of times.

When the condition for terminating the water supply process is not satisfied, the plant cultivation apparatus may return to step S220 and perform a water supply operation for each bed until the condition for terminating the water supply process is satisfied.

In this way, the water supply operation may be performed a plurality of times for each of the plurality of beds.

The embodiments of the present disclosure have been described above with reference to the accompanying drawings, but the present disclosure is not limited to the above embodiments and may be manufactured in various different forms, and it is understood that those skilled in the art to which the present invention pertains may implement the present invention in other specific forms without changing the technical spirit or essential features thereof. Therefore, it should be understood that the embodiments described above are illustrative in all respects and not restrictive.

The invention claimed is:

1. A plant cultivation apparatus comprising:
 a cabinet defining a cultivation chamber in which a plurality of beds are accommodated;
 a sensor positioned in a lower portion of the beds and configured to detect liquid on the plurality of beds;
 a liquid supply module provided in the cultivation chamber and configured to supply liquid to at least one of the plurality of beds; and a controller configured to:
- determine when to supply liquid to the plurality of beds,
- determine, based on information collected by the sensor, whether liquid is present in the plurality of beds in response to determining to supply liquid to the plurality of beds, and
- sequentially perform a liquid supply operation to one or more beds, of the plurality of beds, in which liquid is not present, wherein the controller, when sequentially performing the liquid supply operation, is further to:
- manage the liquid supply module to supply a predetermined amount of liquid to a bed of the one or more beds,
- count a number of times that the liquid supply module liquid-supplies liquid to the bed, and
- manage the liquid supply module to wait for a delay time before again supplying liquid to the bed, wherein the bed has a depression which is formed to be recessed from an inner bottom of the bed to receive and store liquid from the liquid supply module, wherein the bed is formed with a sensing protrusion which protrudes from a bottom surface of the depression, the sensing protrusion having an upper surface positioned higher than the bottom surface of the depression and lower than a bottom surface of the bed, and wherein the sensor detects whether residual liquid is present on the upper surface of the sensing protrusion.

2. The plant cultivation apparatus of claim 1, wherein the controller is configured to determine whether the plant cultivation apparatus is capable of supplying liquid, and determine to supply liquid to the plurality of beds when the plant cultivation apparatus is capable of supplying liquid.

3. The plant cultivation apparatus of claim 2, wherein the liquid supply module includes a tank configured to store liquid, and
wherein the controller determines that the plant cultivation apparatus is capable of supplying liquid when the controller determines at least one of liquid being present in the tank, a door of the plant cultivation apparatus being closed, or the tank being mounted in place.

4. The plant cultivation apparatus of claim 1, wherein the liquid supply module includes a tank configured to store liquid, a pump configured to pump liquid from the liquid tank to at least one of the beds, and a flow path valve configured to control a flow of liquid pumped by the pump to the bed.

5. The plant cultivation apparatus of claim 1, wherein the controller is configured to repeatedly perform the liquid supply operation until the number of times that the liquid supply module supplies liquid to each of the one or more beds reaches a specified number of times.

6. The plant cultivation apparatus of claim 4, wherein the controller is configured to drive the liquid pump for a predetermined length of time and open the flow path valve during the liquid supply operation.

7. The plant cultivation apparatus of claim 1, wherein the controller is configured to:
- determine, based on the information collected by the sensor, a length of time that liquid is present in one of the beds, and
- determine to stop supplying liquid to the beds when the length of time that liquid is present in one of the beds is greater than a predetermined time.

8. The plant cultivation apparatus of claim 5, wherein the controller is configured to determine to stop supplying liquid to the plurality of beds regardless of the number of times that the liquid supply module supplies liquid to the plurality of beds when a predetermined time has lapsed since liquid is detected in each of the plurality of beds.

9. The plant cultivation apparatus of claim 8, wherein the controller is configured to end the liquid supply operation when liquid is present in each of the plurality of beds, and determine whether liquid is present in the plurality of beds when the predetermined time has not elapsed.

10. The plant cultivation apparatus of claim 5, wherein the controller is configured to determine to stop supplying liquid to the plurality of beds when the numbers of times that the liquid supply module has supplied liquid to each of the plurality of beds is greater than the specified number of times.

11. A liquid supply method for a plant cultivation apparatus, the plant cultivation apparatus including a cabinet defining a cultivation chamber to accommodate a plurality of beds, the method comprising:
- determining, by the plant cultivation apparatus, whether to supply liquid to the plurality of beds;
- determining, by a sensor of the plant cultivation apparatus, whether liquid is present in the plurality of beds, the sensor being positioned in a lower portion of the beds; and
- sequentially performing, by the plant cultivation apparatus, a liquid supply operation to one or more of the plurality of beds in which liquid is not present based on information collected by the sensor, wherein performing the liquid supply operation for one or more of the plurality of beds includes:
- supplying a predetermined amount of liquid to a bed, of the plurality of beds, in which liquid is not present,
- counting a number of times that liquid is supplied to the bed, and
- waiting for at least a liquid supply delay time before supplying additional liquid to the bed, wherein the bed has a depression which is formed to be recessed from an inner bottom of the bed to receive and store liquid from a liquid supply module, wherein the bed is formed with a sensing protrusion which protrudes from a bottom surface of the depression, the sensing protrusion having an upper surface positioned higher than the bottom surface of the depression and lower than a bottom surface of the bed, and wherein the sensor detects whether residual liquid is present on the upper surface of the sensing protrusion.

12. The liquid supply method of claim 11, wherein determining whether to supply liquid to the plurality of beds includes:
- determining whether the plant cultivation apparatus is capable of supplying liquid to the plurality of beds; and
- determining to supply liquid to the plurality of beds when the plant cultivation apparatus is capable of supplying liquid to the plurality of beds.

13. The liquid supply method of claim 12, wherein determining whether the plant cultivation apparatus is capable of supplying liquid to the plurality of beds includes determining whether liquid is present in a liquid tank included in the plant cultivation apparatus, whether a door of the plant cultivation apparatus is closed, and whether the liquid tank is mounted in place.

14. The liquid supply method of claim 11, further comprising:
repeatedly performing the liquid supply operation until the number of times that the liquid is suppled to each of the plurality of beds reaches a specified number of times.

15. The liquid supply method of claim 14, further comprising:
terminating a supply of liquid to the plurality of beds when the number of times of that liquid is supplied to each of the plurality of beds is greater than the specified number of times.

16. The liquid supply method of claim 11, wherein the performing of the liquid supply operation includes driving a pump for a predetermined time and opening a valve regulating a flow path from the pump to the one or more of the beds during the liquid supply operation.

17. The liquid supply method of claim 11, further comprising:
obtaining a length of time for which liquid remains in the bed after liquid is supplied to the bed; and
terminating a supply of the liquid to the beds when the obtained length of time is greater than a predetermined time.

18. The liquid supply method of claim 11, wherein liquid is not supplied to any of the plurality of beds when liquid is present in each of the plurality of beds.

19. The liquid supply method of claim 15, further comprising:
terminating a supply of liquid to the plurality of beds regardless of the number of times that the liquid is supplied to plurality of beds when a predetermined period of time has lapsed since liquid is detected in each of the plurality of beds.

20. The liquid supply method of claim 11, wherein performing the liquid supply operation includes:
supplying additional liquid to the bed after the supply delay time based on determining that liquid is not present in the bed; and
incrementing the count of the number of times that liquid is supplied to the bed based on supplying the additional liquid.

* * * * *